US007090241B2

(12) United States Patent
Silva

(10) Patent No.: US 7,090,241 B2
(45) Date of Patent: Aug. 15, 2006

(54) LOW-HIGH CHAIR

(76) Inventor: Armando Silva, 3615 Nations Ave., El Paso, TX (US) 79930

( * ) Notice: Subject to any disclaimer, the term of this patent is extended or adjusted under 35 U.S.C. 154(b) by 143 days.

(21) Appl. No.: 10/800,643

(22) Filed: Mar. 16, 2004

(65) Prior Publication Data

US 2004/0183276 A1 Sep. 23, 2004

Related U.S. Application Data

(60) Provisional application No. 60/456,344, filed on Mar. 20, 2003.

(51) Int. Cl.
*B62M 1/14* (2006.01)

(52) U.S. Cl. .................................... 280/657; 280/250.1

(58) Field of Classification Search ................ 280/657, 280/647, 250.1
See application file for complete search history.

(56) References Cited

U.S. PATENT DOCUMENTS

| | | | | |
|---|---|---|---|---|
| 3,807,795 A | | 4/1974 | Weant et al. | 297/330 |
| 4,231,614 A | | 11/1980 | Shaffer | 297/330 |
| 4,886,288 A | * | 12/1989 | Dysarz | 280/250.1 |
| 4,912,796 A | | 4/1990 | Crump | 14/69.5 |
| 4,934,723 A | * | 6/1990 | Dysarz | 280/250.1 |
| 5,011,175 A | * | 4/1991 | Nicholson et al. | 280/304.1 |
| 5,375,913 A | * | 12/1994 | Blanchard | 297/330 |
| 5,500,965 A | * | 3/1996 | Hannagan et al. | 5/654 |
| 5,520,403 A | | 5/1996 | Bergstrom | 280/250.1 |
| 5,553,548 A | | 9/1996 | Eaton | 104/183 |
| 5,772,237 A | * | 6/1998 | Finch et al. | 180/65.1 |
| 6,276,704 B1 | * | 8/2001 | Suiter | 280/250.1 |
| 2003/0230451 A1 | | 12/2003 | Garrett | |

* cited by examiner

*Primary Examiner*—Kevin Hurley
(74) *Attorney, Agent, or Firm*—Robert Platt Bell

(57) ABSTRACT

The low-high chair provides a specially designed wheelchair with a seat that can be raised or lowered so that the wheelchair can be maneuvered in or out of a van without the risk of bumping someone's head on the roof of the van. The chair may also be adjusted for other purposes, such as driving a van, sitting at tables of various heights, or merely adjusting one's height to get a better view or be at the same height as one's contemporaries (e.g., at a movie theater or the like). The lift mechanism is operated by a pneumatic cylinder which is powered by an on-board compressed air tank. An inexpensive pneumatic valve may be used to raise or lower the chair, controlled by either the wheelchair user, or an assistant. The pneumatic tank may provide enough stored energy to raise and lower the user several times a day without recharging.

24 Claims, 3 Drawing Sheets

DETAIL A

LOW-HIGH CHAIR

CROSS REFERENCE TO RELATED APPLICATIONS

The present application claims priority from Provisional U.S. Patent Application No. 60/456,344 filed on Mar. 20, 2003, and incorporated herein by reference.

FIELD OF THE INVENTION

The present invention relates to a wheelchair. In particular, the present invention is directed toward a wheelchair with an adjustable height seating surface, which is pneumatically activated.

BACKGROUND OF THE INVENTION

Buying a van equipped with a wheelchair lift can be a problem due to the considerable cost of a van and the lift. As a result, some people use ramps in order to maneuver a wheelchair into a van without a wheelchair lift. Crump, U.S. Pat. No. 4,912,796, issued Apr. 3, 1990, and incorporated herein by reference, discloses an example of such a ramp.

Unfortunately, it is all too easy to accidentally bump one's head as one is entering or leaving a van. The user either has to purchase a van with a raised door, which is often very expensive, or has to duck or otherwise squat down in the wheelchair when entering the van.

In addition, there may be situations where a wheelchair user wishes to alter the height of the chair seat. Tables are provided at various heights, from coffee table height to bar height, and a wheelchair user often finds themselves at the wrong height for a given table.

Vans equipped with handicapped controls can be very expensive to build, as often the floor of the van needs to be made adjustable in order that the wheelchair user is at the right height with respect to the vehicle controls. Hydraulically lowering floors and the like can be quite expensive in addition to hand controls, which are relatively inexpensive. If a wheelchair user could have an adjustable height wheelchair, the cost of converting a van to wheelchair use could be decreased significantly. Given that such an adjustable height wheelchair would allow the use of inexpensive ramps in place of complicated, bulky, and difficult to use lifts, handicapped accessible and operable vans could be made more affordable, and thus more accessible for wheelchair users.

Of course, traditional office chairs and the like are known to use pneumatic cylinders that are pre-charged and sealed like a pneumatic spring. By releasing a lever, the user can push themselves up or down to a desired chair height.

For a wheelchair user, however, such a solution may not be workable. To begin with, the traditional pneumatic spring of an office chair serves only to reduce the force required to raise or lower the chair. The pneumatic spring does not actually raise or lower the user in most instances. Rather, the user raises or lowers the chair by altering their weight on the chair, which requires the use of their legs. For most wheelchair users, this may be a problem.

In addition, most office chairs use a centrally located pneumatic cylinder that acts as a support for the chair. Such a central cylinder may be useful in that it allows the chair to swivel. However, for a wheelchair, such a design may not be suitable, as it may not provide the stability needed for the seating surface.

Mechanical mechanisms are known in the art for raising and lowering wheelchair seat heights. Bergstrom, et al., U.S. Pat. No. 5,520,403, issued May 28, 1996, and incorporated herein by reference, discloses a wheelchair with translating seat and patient lift. While Bergstrom discloses an adjustable seat, note that the seat is designed to be adjusted with a hand crank, used from behind the seat. Thus, a second person is needed to raise and lower the wheelchair user, and the wheelchair user cannot raise and lower themselves. Moving the crank to a position where the wheelchair user can reach it may not be an option, as the crank would either be in the way, or in an awkward position for cranking. In addition, the user may have some other disability that would prevent them from turning such cranks.

One solution would be to provide a wheelchair with an electrical mechanism to raise and lower the seating surface. Shaffer, U.S. Pat. No. 4,231,614, issued Nov. 4, 1980, and Weant et al., U.S. Pat. No. 3,807,795, issued Apr. 30, 1974, both of which are incorporated herein by reference, disclose electromechanical devices for altering the position of a wheelchair user. While both of these devices may perform their intended function, the weight, complexity, and cost of batteries may make them impractical and too expensive for regular use. A wheelchair should be as light and as inexpensive as possible such that it is easy to roll, and easy to afford for the user.

Finch et al. U.S. Pat. No. 5,772,237, issued Jun. 30, 1998, discloses a suspension for a powered wheelchair using fluid cylinders. Finch explicitly states that his suspension can be lowered to assist in getting in and out of a van, and thus does address one of the problems outlined above. However, Finch uses an expensive and complex suspension system using multiple cylinders and an adjustable suspension in connection with a powered wheelchair. This system might not be adaptable to a manually operated wheelchair, for example.

Thus, it remains a requirement in the art for a wheelchair with an inexpensive, lightweight, and affordable height adjustment feature.

SUMMARY OF THE INVENTION

The low-high chair of the present invention provides a specially designed wheelchair with a seat that can be raised or lowered so that the wheelchair can be maneuvered in or out of a van without the risk of bumping someone's head on the roof of the van. The chair may also be adjusted for other purposes, such as driving a van, sitting at tables of various heights, or merely adjusting one's height to get a better view or be at the same height as one's contemporaries (e.g., at a movie theater or the like). The low-high chair of the present invention provides greater convenience for anyone who must use a wheelchair.

The low-high chair of the present invention comprises components of a typical prior art wheelchair, which measures approximately 38 inches in overall height, 24 to 27 inches in overall length and 20 to 21 inches in overall width. The wheelchair may be equipped with a metal frame, a plastic seat, a backrest made of plastic and foam and two padded armrests. Other components of the wheelchair may include two plastic push handles, four rubber or plastic wheels and two axles. Alternately, more traditional large wheels may be provided for a self-propelled chair.

The low-high chair of the present invention also includes an air tank, air shock bearings (optional), a one-fourth by one-inch flat steel plate, an angle iron measuring one inch in length, one inch in width and one-eighth of an inch in thickness, two scissor-style side supports, a valve, two chains measuring four inches in length and two round pins measuring two and one half inches in length by one-fourth of an inch in diameter. These components may be produced from produced from corrosion-resistant metal.

In use, a user may sit in the low-high chair and wheel it to a ramp placed next to a van. When needed, the chair may be lowered to a height of approximately 14 inches such that one can enter the van without the risk of bumping one's head. The chair may then be returned to a height of approximately 20 inches after use. The chair may also be provided to raise above 20 inches, or to other heights, to provide different lift levels for the user.

The lift mechanism is operated by a pneumatic cylinder which is powered by an on-board compressed air tank. An inexpensive pneumatic valve may be used to raise or lower the chair, controlled by either the wheelchair user, or an assistant. The pneumatic tank may provide enough stored energy to raise and lower the user several times a day without recharging. A manually operated or small inexpensive electric pump may be used to recharge the pneumatic tank, or the user may recharge it from other sources of compressed air (gas station or the like).

DETAILED DESCRIPTION OF THE INVENTION

Figure 1:
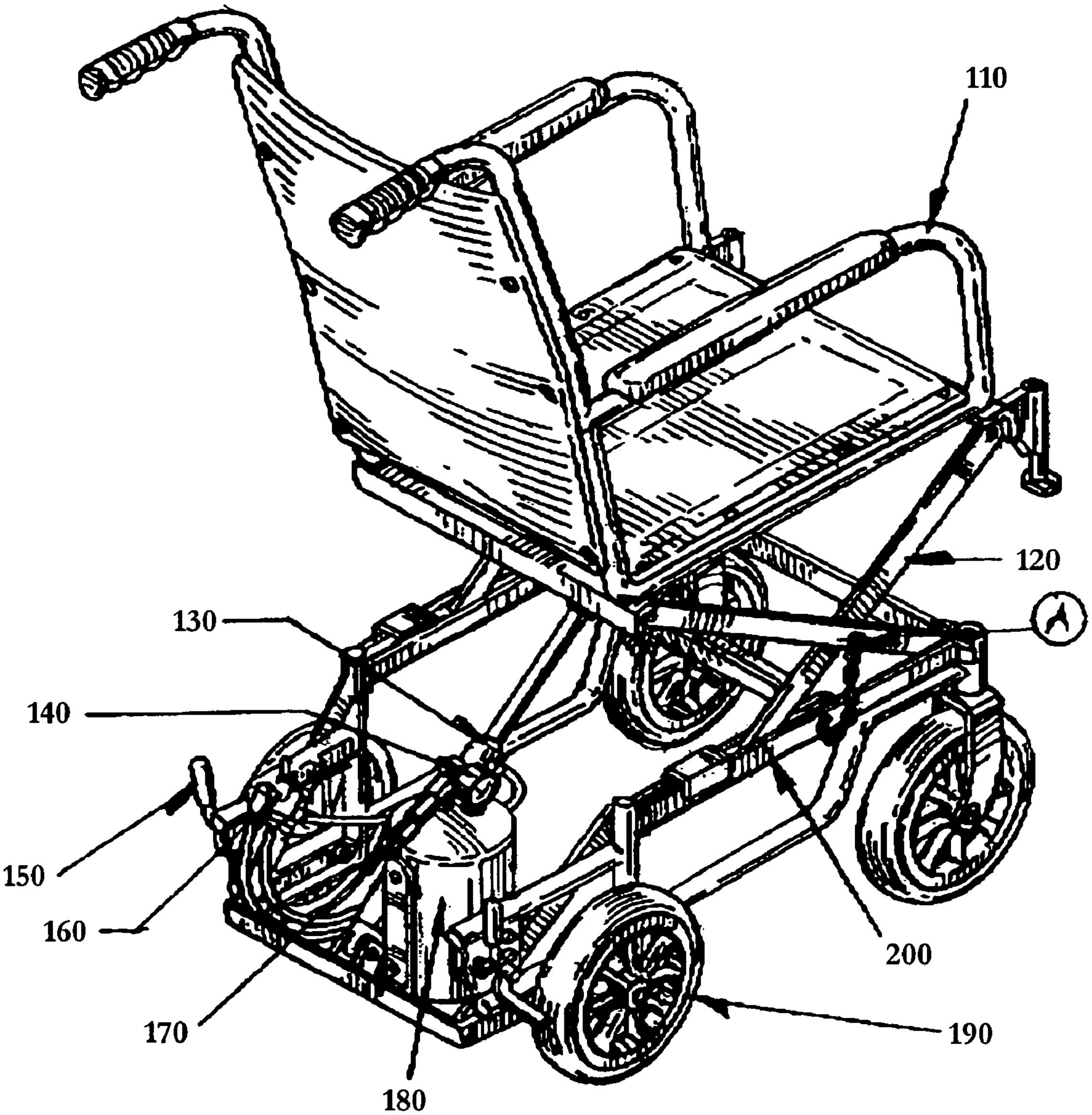
FIG. 1 is a rear perspective view of the high-low chair of the present invention.

FIG. 1 is a rear perspective view of the high-low chair of the present invention. Note that for purposes of illustration, the chair 110 of FIG. 1 is illustrated as a four-wheel wheel chair of the type typically designed to be pushed by others. However, other wheel chair types such as the traditional large wheel chair, designed to be self-propelled, may be used. The apparatus of the present invention may also be applied to other types of chairs, such as powered chairs and the like. However the primary objective of the present invention is to provide the adjustable height feature at a minimum cost and weight, and thus it is primarily intended for use in simpler chair designs.

Chair 110 includes wheels 190, which as noted above may comprise four smaller wheels, including two castor wheels, or may include two castor wheels and two self-driven larger wheels intended to be driven by the user. As is typical with prior art wheelchairs, chair 110 may include locking brake levers 150 and the other features know for wheelchairs, including a seat, armrests, backrest, and the like.

Chair 10 includes a scissors lift 120 which may be used to adjust the chair height. Scissors lift may be driven by pneumatic cylinder 130. Pneumatic cylinder 130 may be sized with an appropriate diameter to lift a 250 lb person (or larger) using 50–100 psi air pressure using scissors lift 120. The stroke of pneumatic cylinder may be sized for the intended range of scissors lift 120. In the primary embodiment, this is a range to drive the seating surface from approximately 20 inches to 14 inches, although other ranges are possible as noted above.

Pneumatic cylinder 130 is driven by compressed air stored in air tank 180. Air tank 180 may comprise an inexpensive compressed air tank such as those sold at local auto parts stores and the like. Such tanks are becoming increasingly inexpensive, and are easily obtained.

In addition, other types of inexpensive compressed air storage devices may be used. For example, published U.S. Patent Application US 2003/0230451, published Dec. 18, 2003, and incorporated herein by reference, discloses that a compressed air tank can be inexpensively made from a section of 3" PVC pipe and two end caps. Since such pipe is rated for over 100 psi, it can easily handle the pressure of stored compressed air. Alternately, the frame of wheelchair 110 may be sealed and used as a compressed air storage reservoir.

The use of an inexpensive compressed air storage reservoir to drive pneumatic cylinder 130 allows the apparatus to be manufactured at a much lower cost than a battery powered device. once inside the van, the user can recharge the storage tank using an inexpensive 12 volt tire inflation pump of the variety sold inexpensively at auto parts stores and the like. Thus, energy may be stored much less expensively as compressed air than as electrical power, without the hassles and dangers associated with batteries, not to mention the costs and periodic replacement associated with batteries.

Alternately, a pneumatic manual pump may be provided for the user to manually charge the storage tank. Thus pump may be provided as part of wheelchair 110 to provide an exercise apparatus and may be optimized to be usable by the wheelchair user and tailored to the user's particular needs and/or disabilities and abilities. In addition, as noted above, the user may simply recharge the tank using a known supply of compressed air such as a gas station compressor or the like.

Refill valve 170 may be provided to allow compressed air tank 180 to be refilled. Gauge 140 may be provided to monitor the pressure in compressed air tank 180. Control valve 160 may be used to extend and retract pneumatic cylinder 130. To extend pneumatic cylinder 130, control valve 160 may feed compressed air from compressed air tank 180 to the piston side of pneumatic cylinder 130, which in turn will raise scissors lift 120. To retract pneumatic cylinder 130, control valve 160 may bleed compressed air from the piston side of pneumatic cylinder 130, which in turn will lower scissors lift 120.

Suitable pressure hoses or lines may be used to connect control valve 160 to pneumatic cylinder 130 and compressed air tank 180, as is known in the art.

Note that for purposes of illustration, all of control valve 160, compressed air tank 180, fill valve 140, and gauge 130 are shown mounted to the back of wheelchair 110. However, in application, such controls and features may be more advantageously mounted so that the chair user may have control over such features. For example, if fill valve 170 and control 160 are mounted near the armrest, the user may be able to adjust the seat height and recharge the system without the need for intervention by others.

Figure 3:
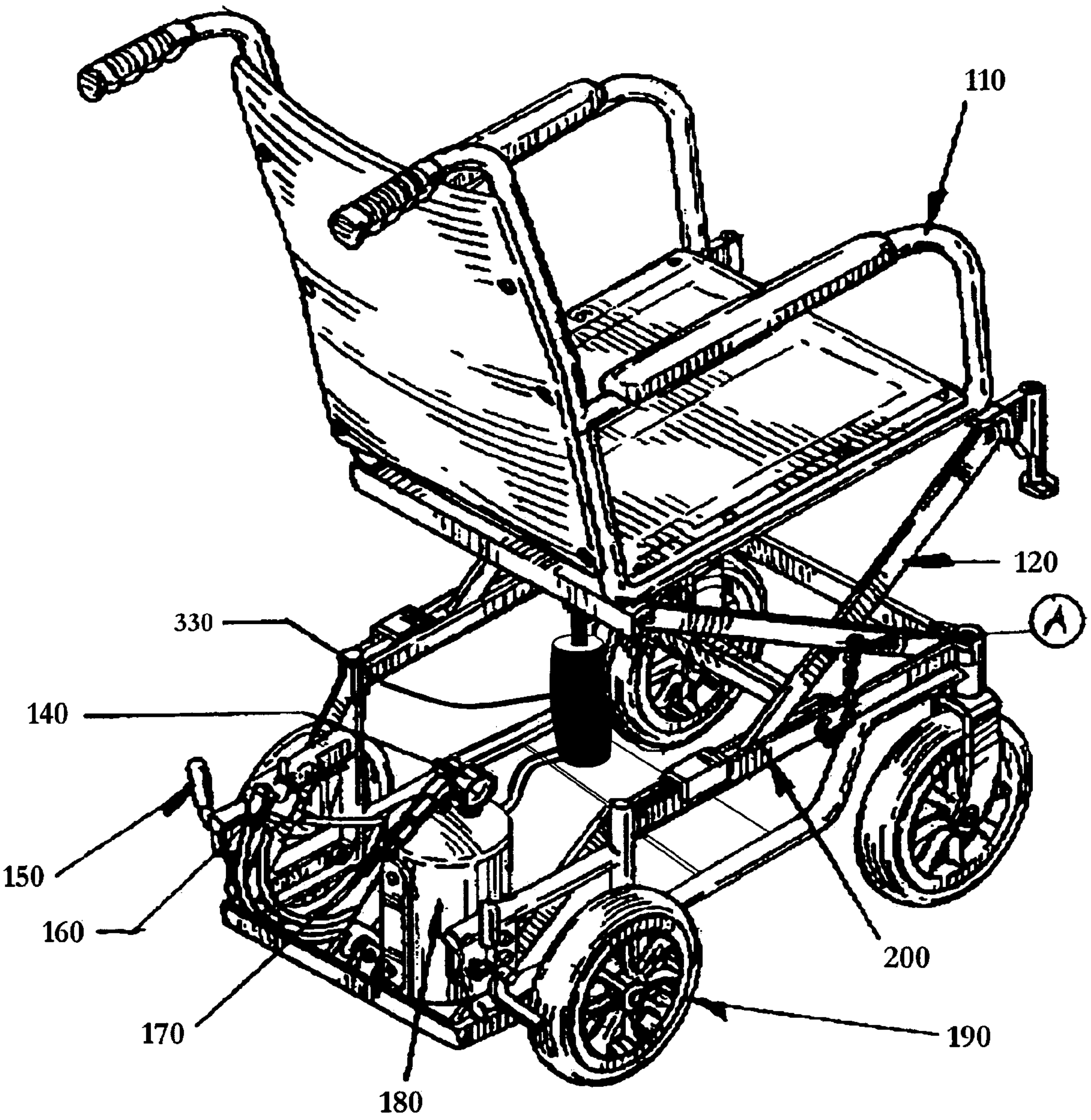
FIG. 3 is a rear perspective view of an alternative embodiment of the high-low chair of the present invention.

Note that although illustrated as a pneumatic cylinder, other types of pneumatic devices may be used to raise and lower the chair height. For example, automotive air springs such as those sold by AIR LIFT and FIRESTONE RUBBER COMPANY may be used to directly raise and lower the chair seat height. FIG. 3 illustrates an example of such an embodiment where an air bladder or spring 330 is substituted for the pneumatic cylinder 130 of FIG. 1. Such devices may be less expensive that the pneumatic cylinder shown in FIG. 1.

In addition, a small inexpensive 12 Volt compressor may be mounted to the device such that the user need only plug the device into a automobile cigarette lighter to recharge compressed air tank 180. Note also that compressed air tank 180 may be reduced in size or eliminated in an application where an electric or manual on-board pump may be provided.

Figure 2:
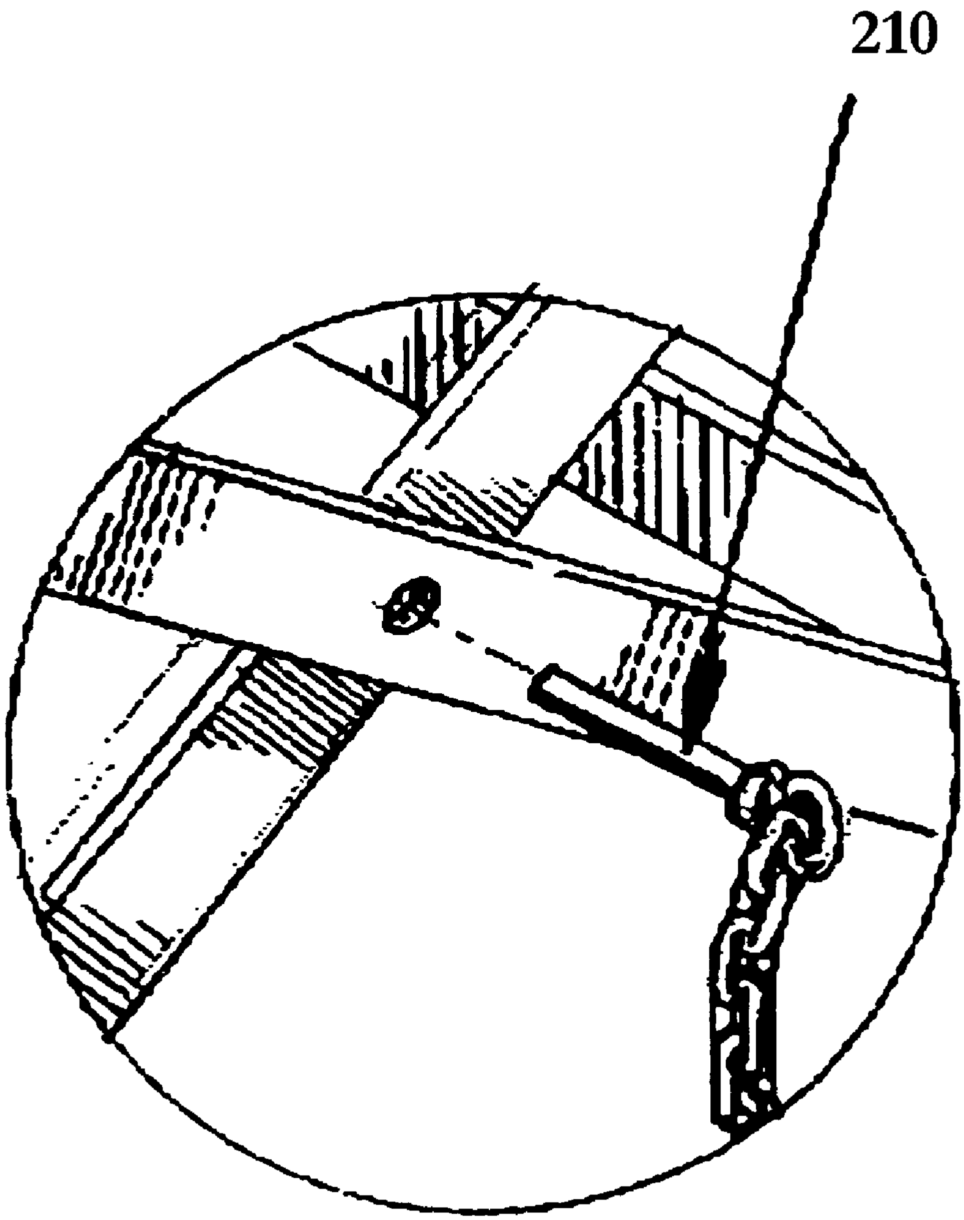
FIG. 2 is an enlarged view of section A of FIG. 1, illustrating the scissor-locking pin.

FIG. 2 is an enlarged view of section A of FIG. 1, illustrating the scissor locking pin. Locking pin 210 may be provided in scissors lift 120 to lock the seat of wheelchair 110 such that the user does not experience a "bouncing" effect due to pneumatic cylinder 130 acting as a pneumatic spring. Locking pin 210 may also prevent the chair from sagging over time if pressure leaks out of pneumatic cylinder 130.

Thus, the present invention provides an inexpensive, lightweight, uncomplicated, and easy to use chair lift that solves many of the problems of the Prior Art. By using stored compressed air as opposed to stored electricity, the present invention reduces cost and weight.

Note also that while disclosed in the context of an adjustable wheelchair, the present invention may also be applied concept of using stored compressed air to raise and lower an object in a portable environment.

While the preferred embodiment and various alternative embodiments of the invention have been disclosed and described in detail herein, it may be apparent to those skilled in the art that various changes in form and detail may be made therein without departing from the spirit and scope thereof.

I claim:

1. An adjustable seating height wheelchair, comprising:

a wheelchair frame providing structural support to the wheelchair;

a plurality of wheels, attached to the frame, allowing the wheelchair to roll;

a seating surface, providing a seat to a user of the wheelchair; and an adjustable seating height mechanism, mechanically moving the seating surface relative to the wheelchair frame between at least two height levels, the adjustable seating height mechanism including:

a pneumatic device extendable and retractable under pneumatic pressure, the pneumatic device coupled to the wheelchair frame and the adjustable seating height mechanism such that when extended, the pneumatic device raises the adjustable seating height mechanism relative to the wheelchair frame to one of the at least two height levels, and when retracted, lowers the adjustable seating height mechanism relative to the wheelchair frame to another of the at least two seating height levels, such that the plurality of wheels all remain in contact with the ground when the adjustable seating height mechanism is extended and retracted;

a pneumatic storage tank, coupled to the pneumatic device, storing a gaseous fluid under pressure and providing pressurized gaseous fluid to the pneumatic device to extend the pneumatic device, and a control valve, coupled to the pneumatic storage tank and the pneumatic device, controlling the flow of the gaseous fluid under pressure to and from the pneumatic device such that when actuated, the pneumatic device may be controllably extended and retracted.

2. The adjustable seating height wheelchair of claim 1, further comprising:

a fill valve, coupled to the pneumatic storage tank, for allowing the pneumatic storage tank to be periodically recharged.

3. The adjustable seating height wheelchair of claim 1, further comprising:

at least one locking pin, coupled to the adjustable seating height mechanism, for locking the adjustable seating height mechanism at at least one of the two seating height levels.

4. The adjustable seating height wheelchair of claim 1, further comprising:

a pump, mounted to the wheelchair, for recharging the pneumatic storage tank.

5. The adjustable seating height wheelchair of claim 1, wherein said pneumatic device further comprises a pneumatic cylinder.

6. The adjustable seating height wheelchair of claim 1, wherein said pneumatic device further comprises an air bag.

7. An adjustable seating height wheelchair comprising:

a wheelchair frame providing structural support to the wheelchair;

a plurality of wheels, attached to the frame, allowing the wheelchair to roll;

a seating surface, providing a seat to a user of the wheelchair; and an adjustable seating height mechanism, mechanically moving the seating surface between at least two height levels, the adjustable seating height mechanism including:

a pneumatic device extendable and retractable under pneumatic pressure, the pneumatic device coupled to the wheelchair frame and the adjustable seating height mechanism such that when extended, the pneumatic device raises the adjustable seating height mechanism to one of the at least two height levels, and when retracted, lowers the adjustable seating height mechanism to another of the at least two seating height levels, a pneumatic storage tank, coupled to the pneumatic device, storing a gaseous fluid under pressure and providing pressurized gaseous fluid to the pneumatic device to extend the pneumatic device, and a control valve, coupled to the pneumatic storage tank and the pneumatic device, controlling the flow of the gaseous fluid under pressure to and from the pneumatic device such that when actuated, the pneumatic device may be controllably extended and retracted;

wherein said adjustable seating height mechanism further comprises a scissors lift coupled between the frame and the seating surface, to uniformly lift the seating surface while maintaining the seating surface in a horizontal position.

8. The adjustable seating height wheelchair of claim 7, further comprising:

a fill valve, coupled to the pneumatic storage tank, for allowing the pneumatic storage tank to be periodically recharged.

9. The adjustable seating height wheelchair of claim 7, further comprising:

at least one locking pin, coupled to the adjustable seating height mechanism, for locking the adjustable seating height mechanism at at least one of the two seating height levels.

10. The adjustable seating height wheelchair of claim 7, further comprising:

a pump, mounted to the wheelchair, for recharging the pneumatic storage tank.

11. The adjustable seating height wheelchair of claim 7, wherein said pneumatic device further comprises a pneumatic cylinder.

12. The adjustable seating height wheelchair of claim 7, wherein said pneumatic device further comprises an air bag.

13. A method of adjusting the seating height of a wheelchair comprising a wheelchair frame providing structural support for the wheelchair, a plurality of wheels, attached to the frame allowing the wheelchair to roll, a seating surface providing a seat for a user of the wheelchair, and an adjustable seating height mechanism, the method comprising the steps of:

storing, in a pneumatic storage tank, coupled to the pneumatic device, a gaseous fluid under pressure, extending and retracting a pneumatic device coupled to the wheelchair frame, under pneumatic pressure supplied by the pneumatic storage tank, the pneumatic device coupled to adjustable seating height mechanism such that when extended, the pneumatic device raises the adjustable seating height mechanism relative to the wheelchair frame, to one of the at least two height levels, and when retracted, lowers the seating surface relative to the wheelchair frame to another of the at least two seating height level s, such that the plurality of wheels remain in contact with the ground when the adjustable seating height mechanism is extended and retracted, and controlling, with a control valve, coupled to the pneumatic storage tank and the pneumatic device, the flow of the gaseous fluid under pressure to and from the pneumatic device such that when actuated, the pneumatic device may be controllably extended and retracted.

14. The method of adjusting the seating height of a wheelchair of claim 13, further comprising the step of recharging the pneumatic storage tank with a fill valve, coupled to the pneumatic storage tank recharged.

15. The method of adjusting the seating height of a wheelchair of claim 13, further comprising the step of locking, with at least one locking pin coupled to the adjustable seating height mechanism, the adjustable height mechanism to at least one of the two seating height levels.

16. The method of adjusting the seating height of a wheelchair of claim 13, further comprising the step of recharging the pneumatic storage tank using an on-board pump coupled to the wheelchair.

17. The method of adjusting the seating height of a wheelchair of claim 13, wherein the pneumatic device further comprises a pneumatic cylinder.

18. The method of adjusting the seating height of a wheelchair of claim 13, wherein the pneumatic device further comprises an air bag.

19. A method of adjusting the seating height of a wheelchair comprising a wheelchair frame providing structural support for the wheelchair, a plurality of wheels, attached to the frame, for allowing the wheelchair to roll, a seating surface, for providing a seat for a user of the wheelchair, and an adjustable seating height mechanism, the method comprising the steps of:

storing, in a pneumatic storage tank, coupled to the pneumatic device, a gaseous fluid under pressure, extending and retracting a pneumatic device under pneumatic pressure supplied by the pneumatic storage tank, the pneumatic device coupled to adjustable seating height mechanism such that when extended, the pneumatic device raises the adjustable seating height mechanism to one of the at least two height levels, and when retracted, lowers the method of adjusting the seating height mechanism to another of the at least two seating height levels, and controlling, with a control valve, coupled to the pneumatic storage tank and the pneumatic device, the flow of the gaseous fluid under pressure to and from the pneumatic device such that when actuated, the pneumatic device may be controllably extended and retracted, further comprising the step of uniformly lifting the seating surface while maintaining the seating surface in a horizontal position using an adjustable seating height mechanism includes a scissors lift coupled between the frame and the seating surface.

20. The method of adjusting the seating height of a wheelchair of claim 19, further comprising the step of recharging the pneumatic storage tank with a fill valve, coupled to the pneumatic storage tank recharged.

21. The method of adjusting the seating height of a wheelchair of claim 19, further comprising the step of locking, with at least one locking pin coupled to the adjustable seating height mechanism, the adjustable height mechanism to at least one of the two seating height levels.

22. The method of adjusting the seating height of a wheelchair of claim 19, further comprising the step of recharging the pneumatic storage tank using an on-board pump coupled to the wheelchair.

23. The method of adjusting the seating height of a wheelchair of claim 19, wherein the pneumatic device further comprises a pneumatic cylinder.

24. The method of adjusting the seating height of a wheelchair of claim 19, wherein the pneumatic device further comprises an air bag.

* * * * *